3,215,696
3-SUBSTITUTED ADENINES AND PREPARATION THEREOF

René Arthur Henri Denayer, Uccle, Belgium, assignor to UCB (Union Chimique-Chemische Bedrijven), S.A., a corporation of Belgium
No Drawing. Filed Oct. 2, 1962, Ser. No. 227,724
Claims priority, application Belgium, Oct. 13, 1961, 485,487, Patent 609,114; May 18, 1962, 496,207, Patent 617,814; Aug. 31, 1962, 496,985, Patent 621,979
13 Claims. (Cl. 260—252)

The present invention relates to a new method for preparing 3-substituted adenines of the formula

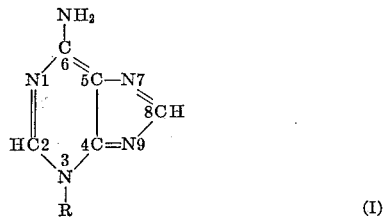

(I)

wherein R is a substituent selected from the group consisting of straight chain alkyl, alkenyl and alkinyl radicals, branched chain alkyl, alkenyl and alkinyl radicals, hydroxyalkyl, dialkylaminoalkyl, cycloalkyl, heterocyclic, benzhydryl and substituted benzhydryl radicals and a radical —$(CH_2)_nX$ wherein X represents a member selected from the group consisting of aromatic and heterocyclic residues and substituted derivatives thereof and $n$ a positive integer of from 1 to 4.

According to the invention, these derivatives are prepared using 4,6-diamino-5-formylamino-pyrimidine as a starting material.

In preparing the 3-substituted adenine derivatives, two alternatives are to be considered:

(a) When R represents an alkyl, alkenyl, alkinyl, dialkylaminoalkyl, cycloalkyl, heterocyclic, benzhydryl or substituted benzhydryl or the radical —$(CH_2)_nX$ wherein $n$ and X have the same meaning as above, 4,6-diamino-5-formylamino-pyrimidine is reacted with the corresponding R halogenide. The reaction product is a quaternary ammonium salt of 3-R-5-formylamino-4-,6-diaminopyrimidine. After setting free the base by means of an alkali, the product is allowed to cyclize in alkaline medium at a temperature below 100° C. to form the corresponding adenine:

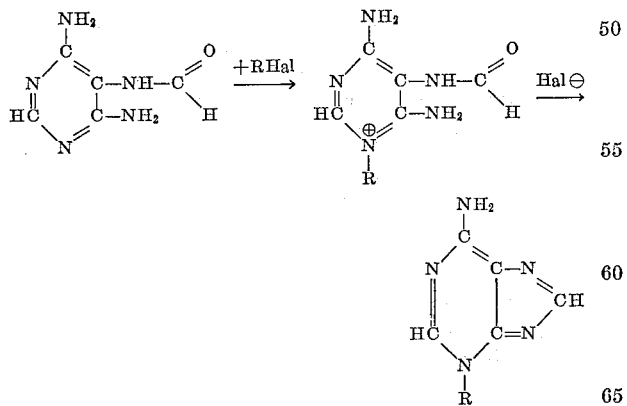

R having the same meaning as above and Hal representing a halogen atom.

(b) When R represents a hydroxyalkyl radical, 4,6-diamino-5-formylamino-pyrimidine is reacted with the appropriate alkylene oxide. Here also quaternization of the pyrimidine occurs, followed by a cyclization as under (a). Starting from ethylene oxide and water, the reaction is as follows:

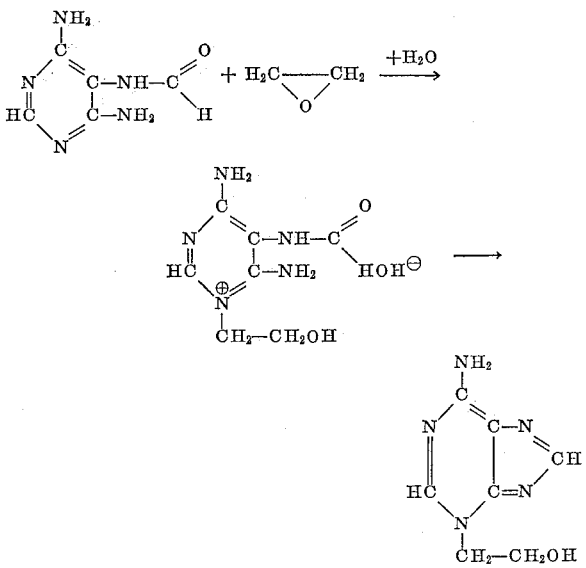

The 4,6-diamino-5-formylamino-pyrimidine used as starting material is easily prepared according to the method of L. F. Cavalieri et al. (J. Am. Chem. Soc. 71 (1949), 553–36) from 4,5,6-triamino-pyrimidine, the latter in its turn being prepared according to the method of R. K. Robins et al. (J. Am. Chem. Soc. 75 (1953), 263).

The invention relates also to the following derivatives of adenine as new products: 3-ethyl-adenine, 3-n-nonyl-adenine, 3-propargyl-adenine, 3-(2-hydroxyethyl)-adenine, 3-(2,3-dihydroxy-propyl)-adenine, 3-(2-dimethylaminoethyl)-adenine, 3-(2-diethylaminoethyl)-adenine, 3-benzyl-adenine, 3-furfuryl-adenine, as well as their pharmaceutically acceptable addition salts with organic and inorganic acids.

A convenient way has been found to differentiate the 3-substituted adenine derivatives from the corresponding 7-substituted adenine derivatives.

From the studies of the U.V. absorption spectra (in 0.1 N HCl solution or in 0.01 N NaOH solution) it results that the 3-substituted adenine derivatives possess an isobestic point at $\lambda=285\pm2$ m$\mu$, whereas 7-substituted compounds have an isobestic point at $\lambda=250\pm8$ m$\mu$.

Comparative values are given in the following table.

| Compounds: | Isobestic point (m$\mu$) |
|---|---|
| 3-methyl-adenine | 283.5 |
| 7-methyl-adenine | 250 |
| 3-ethyl-adenine | 286 |
| 3-n-nonyl-adenine | 285 |
| 3-(3′,3′-dimethylallyl)-adenine | 285.5 |
| 7-(3′,3′-dimethylallyl)-adenine | 250 |
| 3-propargyl-adenine | 286 |
| 3-(2-hydroxyethyl)-adenine | 285 |
| 3-(2,3-dihydroxypropyl)-adenine | 286 |
| 3-(2-dimethylaminoethyl)-adenine | 287 |
| 7-(2-dimethylaminoethyl)-adenine | 250 |
| 3-(2-diethylaminoethyl)-adenine | 283 |
| 7-(2-diethylaminoethyl)-adenine | 250 |
| 7-(3-dimethylaminopropyl)-adenine | 248 |
| 7-cyclopentyl-adenine | 250 |
| 3-benzyl-adenine | 286 |
| 7-benzyl-adenine | 250 |
| 7-[2-(N-morpholino)-ethyl]-adenine | 254 |

| Compounds—Continued | Isosbestic point (mµ) |
|---|---|
| 7-[2-(4'-phenyl-1'-piperazino)-ethyl]-adenine | 258 |
| 3-furfuryl-adenine | 286.5 |
| 7-furfuryl-adenine | 250 |
| 7-(p-chlorobenzylhydryl)-adenine | 252 |

It has been discovered that the compounds according to the Formula I mentioned hereinabove have useful pharmacological activities, i.e., analeptic, bronchodilator, vaso- and coronarodilator, tranquilizing and even diuretic activities.

The following examples are given by way of illustration only and not by way of limitation

Example 1.—Preparation of 3-methyl-adenine 1.53 g. of 4,6-diamino-5-formylamino-pyrimidine are dissolved hot in 125 ml. of dimethylformamide. 1.56 g. of methyl oxide is added thereto and the mixture is refluxed between 80° and 120° C. for one hour.

The solution is evaporated under vacuum and the mass is taken in up in water. Potassium carbonate is added until precipitation of the 3-methyl-adenine occurs. The precipitate is filtered off and dissolved in water. After treatment of the solution with activated charcoal the solution is allowed to crystallize out.

0.45 g. of 3-methyl-adenine monohydrate is obtained; melting point: 300–302° C. (after sublimation). Yield: 27%.

The corresponding sulfate, prepared according to the conventional method, has a melting point of 268–270° C.

Analysis for $C_6H_7N_5 \cdot H_2O$:      Percent N
   Calculated _____ 41.90
   Found _____ 42.03

The U.V. spectrum analysis of the monohydrate gives the following results:

| Solvent | λMax. | λMin. | εMax. | ε.280 / ε.260 |
|---|---|---|---|---|
| HCl 0.1 N | 274 | 236 | 15,900 | 1.26 |
| NaOH 0.01 N | 272 | 242 | 13,600 | 1.46 |

These values are in perfect agreement with those cited for 3-methyl-adenine by P. Brookes and P. D. Lawley (J. Chem. Soc. London, 1960, p. 539–45).

Example 2.—Preparation of 3-ethyl-adenine (a) *Quaternary salt of 4,6-diamino-5-formylamino-3-ethyl-pyrimidine.*—19 g. of ethyl iodide are added to a suspension of 15.3 g. of 4,6-diamino-5-formylamino-pyrimidine in 300 ml. of dimethyl-formamide.

After heating for 5 hours at 60° C. a quaternary salt is formed. This salt, after vacuum evaporation of the dimethyl-formamide, is filtered off and then washed with acetone and with alcohol.

(b) *3-ethyl-adenine.*—The quaternary salt obtained under (a) is dissolved with the appropriate quantity of 5 percent by weight sodium hydroxide solution. The solution so obtained is heated at 60–65° C. for 10 minutes and then salted out by addition of solid potassium carbonate. An oil separates which crystallizes progressively. The crystalline mass is recrystallized from water. Melting point: 233° C. Yield: 61%.

Analysis for $C_7H_9N_5$:      Percent N
   Calculated _____ 42.9
   Found _____ 43.4

Example 3.—Preparation of 3-n-nonyl-adenine (a) *Quaternary salt of 4,6-diamino-5-formylamino-3-n-nonyl-pyrimidine.*—10 ml. of n-nonyl bromide are added to a suspension of 7.5 g. of 4,6-diamino-5-formylamino-pyrimidine in 200 ml. of dimethylformamide.

After heating for 3 hours at 120–140° C. a quaternary salt is formed which, after dimethylformamide has been evaporated in vacuo, is filtered off. Then it is washed with acetone.

(b) *3-n-nonyl-adenine.*—The quaternary salt formed under (a) is dissolved with the appropriate quantity of a 5 percent by weight solution of sodium hydroxide. The obtained solution is heated at 50–60° C. for 5 minutes and then salted out by adding solid potassium carbonate. The oil which separates out is crystallized from acetone-water (1/1). The product crystallizes with 0.5 molecule of water. Melting point: 224–225° C. Yield: 38%.

Analysis for $C_{14}H_{23}N_5 \cdot \frac{1}{2}H_2O$:      Percent N
   Calculated _____ 25.9
   Found _____ 25.9

Example 4.—Preparation of 3-(3',3'-dimethyl)-adenine

The procedure of Example 1 is followed, using 2 g. of 3,3-dimethylallyl bromide instead of 1.56 g. of methyl iodide.

After 4 hours' heating at 60–70° C., a precipitation is observed.

After cooling, filtering and drying, 2.4 g. of 4,6-diamino-3-(3',3'-dimethylallyl)-5 - formylamino - pyrimidinium bromide is obtained. Yield: 80%.

Analysis for $C_{10}H_{16}N_5OBr$:      Percent N
   Calculated _____ 26.5
   Found _____ 26.5

To this bromide a 5 percent aqueous solution of potassium hydroxide is added and the mixture is heated at 60° C. At first a solubilization is observed, followed by crystallization.

The crystalline mass is filtered off and recrystallized from water. 1 g. of 3-(3',3'-dimethylallyl)-adenine is obtained. Melting point: 229–230° C.

Analysis for $C_{10}H_{13}N_5$:      Percent N
   Calculated _____ 34.46
   Found _____ 34.25

The U.V. spectrum analysis gives the following data:

| Solvent | λ Max. | λ Min. | ε Max. | ε.280 / ε.260 |
|---|---|---|---|---|
| HCl 0.1 N | 274 | 238 | 17,500 | 1.32 |
| NaOH 0.01 N | 273 | 245 | 13,300 | 1.47 |

Example 5.—Preparation of 3-propargyl-adenine (a) *Quaternary salt of 4,6-diamino-5-formylamino-3-propargyl-pyrimidine.*—15 g. of 4,6-diamino-5-formylamino-pyrimidine are suspended in 200 ml. of dimethylformamide. 12 ml. of propargyl bromide is added thereto. The mixture is heated slowly up to 110° C. and this temperature is maintained for 3 hours. The solvent is evaporated in vacuo. The quaternary salt, which appears in the form of a resin, is taken up in isopropanol. Formation of crystals is observed. 24 g. thereof are collected, a quantity corresponding to a yield of 89%.

(b) *3-propargyl-adenine.*—The crystals of the quaternary salt formed under (a) are dissolved in water and the obtained solution alkalized with a 20 percent aqueous solution of potassium hydroxide. 3-propargyl-adenine crystallizes out at once. The latter can be recrystallized from water while avoiding heating the solution to boiling (decomposition). Melting point: 196° C. Yield: 65%.

Analysis for $C_8H_7N_5 \cdot H_2O$:      Percent N
   Calculated _____ 36.6
   Found _____ 37.0

Example 6.—Preparation of 3-(2-hydroxyethyl)-adenine (a) *Quaternary salt of 4,6-diamino-5-formylamino-3-(2-hydroxyethyl)-pyrimidine.*—A stream of ethylene oxide is passed through a 5 percent aqueous solution of 4,6-diamino-5-formylamino-pyrimidine heated to about 80° C. An increase of the pH value to 11–12 is observed, which indicates quaternization.

In order to avoid polymerization, the pH is brought back to about 6.5 by adding acetic acid. Quaternization is completed after 7–9 hours when the pH no longer changes.

(b) *3-(2-hydroxyethyl)-adenine.*—The mixture obtained under (a) is partially concentrated in vacuo at a temperature of 70° C. The concentrated aqueous solution is alkalized with solid potassium carbonate while keeping temperature at about 70° C., and after cooling filtered. The product is purified by dissolution in acid medium (addition of hydrochloric acid), decolorizing with animal black and alkalizing with ammonia. Melting point: 279–280° C. Yield: 45%.

Analysis for $C_7H_9N_5O$: Percent N
Calculated ------------------------------- 39.1
Found ---------------------------------- 39.1

*Example 7.—Preparation of 3-(2,3-dihydroxypropyl)-adenine*

(a) *Quaternary salt of 4,6-diamino-5-formylamino-3-(2,3-dihydroxypropyl)-adenine.*—The procedure is the same as in Example 6(a), except ethylene oxide is replaced by the equivalent quantity of epoxypropanol.

(b) *3-(2,3-dihydroxypropyl) - adenine.*—Applying the same operating condition as in Example 6(b), the corresponding 3-(2,3-dihydroxypropyl)-adenine is obtained in the form of crystals. Melting point: 298–300° C. Yield: 40%.

Analysis for $C_8H_{11}N_5O_2$: Percent N
Calculated ------------------------------- 33.4
Found ---------------------------------- 33.4

*Example 8.—Preparation of 3-(2-dimethylaminoethyl)-adenine*

FIRST METHOD (a) *Quaternary salt of 4,6 - diamino - 5 - formylamino - 3 - (2 - dimethylaminoethyl) - pyrimidine.*—15 g. of 4,6-diamino - 5 - formylamino - pyrimidine are suspended in 1 liter of dimethylformamide. 10.75 g. of 2-dimethylaminochloroethane are added thereto and heating is performed for 5 hours at 80° C.

The solvent is evaporated in vacuo, then the residue is taken up in a 20 percent aqueous solution of hydrochloric acid. The latter is filtered on activated charcoal and the solvent is evaporated under vacuum, leaving a pasty residue.

By treating this residue with ammonia until alkalinity (pH 8) and filtering, 9.5 g. of the starting pyrimidine is recovered.

(b) *3 - (2 - dimethylaminoethyl) - adenine.*—To the filtrate obtained under (a) after precipitation with ammonia solid potassium hydroxide is added so as to obtain a KOH concentration of 5%, then the mass is heated for 5 minutes at 65° C. The solution is salted out with solid potassium carbonate. The solid which separates is filtered off and taken up in enough hot water to dissolve it completely. After cooling, 5.5 g. of 3 - (2 - dimethylaminoethyl)-adenine are separated by filtration.

The latter is chromatographically purified on an alumina column, using ethanol as eluent. The purified product melts at 211–212° C. Yield: 25%.

Analysis for $C_9H_{14}N_6$: Percent N
Calculated ------------------------------- 40.75
Found ---------------------------------- 40.85

SECOND METHOD (a) *Quaternary salt of 4,6 - diamino - 5 - formylamino - 3 - (2 - dimethylaminoethyl) - pyrimidine.*—16 g. of 4,6-diamino - 5 - formylamino - pyrimidine are suspended in 250 ml. of water. Then 8.2 g. of sodium acetate and 14.4 g. of 2 - dimethylaminochloroethane hydrochloride are added thereto. This reaction mixture is thereafter heated for 15 hours at 80° C., then for 6 hours at 80–100° C.

The solution is then half-concentrated under vacuum and ammonia (d.=0.93) is added thereto until alkalization. After cooling, filtration is carried out to separate 9.4 g. of the starting pyrimidine.

(b) *3 - (2 - dimethylaminoethyl) - adenine.*—To the filtrate obtained under (a) after precipitation with ammonia, solid potassium hydroxide is added so as to obtain a KOH concentration of 5%; then the mass is heated for 10 minutes at 65° C. The solution is salted out with solid potassium carbonate and in this manner an oil separates out.

The latter is chromatographed on an alumina column, using ethanol as an eluent.

In this way 3 - (2 - dimethylaminoethyl) - adenine melting at 211–212° C. is obtained. Yield: 16%.

*Example 9.—Preparation of 3-(2-diethylaminoethyl)-adenine*

The first method of Example 8 is followed using the corresponding quantity of 2 - diethylaminochloroethane (13.45 g.), instead of 2 - dimethylaminochloroethane. After purification by chromatography, 3 - (diethylaminoethyl) - adenine melting at 209–210° C. is obtained. Yield: 28%.

When the second method of Example 8 is followed but 2 - diethylaminochloroethane hydrochloride (17.1 g.) is used, two products are isolated chromatographically, i.e. 9 - (2 - diethylaminoethyl) - adenine (melting point: 181–182° C.) and 3 - (2 - diethylaminoethyl) - adenine (melting point: 209–210° C.). Yield: 20%.

Analysis for $C_{11}H_{18}N_6$:

|  | 3-substituted derivative—Percent N | 9-substituted derivative—Percent N |
| --- | --- | --- |
| Calculated | 35.87 | 35.87 |
| Found | 36.0 | 36.05 |

*Example 10.—Preparation of 3-benzyl-adenine*

Operating as in Example 1, 7.7 g. of 4,6 - diamino - 5-formylamino-pyrimidine are heated with 6.5 g. of benzyl chloride for 4 hours.

The precipitate is filtered off and then dissolved in water. After treatment of the solution with activated charcoal, ammonia is added thereto.

4.7 g. of 3 - benzyl - adenine semi-hydrate melting at 278–279° C. is obtained. Yield: 42%.

Analysis for $C_{12}H_{11}N_5 \cdot \frac{1}{2}H_2O$: Percent N
Calculated ------------------------------- 29.9
Found ---------------------------------- 29.6

The U.V. spectrum analysis for the semi-hydrate gives the following results:

| Solvent | λ Max. | λ Min. | ε Max. | ε 280 / ε 260 |
| --- | --- | --- | --- | --- |
| HCl 0.1 N | 275 | 238 | 17,700 | 1.43 |
| NaOH 0.01 N | 274 | 246 | 12,700 | 1.42 |

*Example 11.—Preparation of 3-furfuryl-adenine*

Operating as in Example 1, 4.6 g. of 4,6 - diamino - 5-formylamino-pyridine are heated for 4 hours with 3.5 g. of furfuryl chloride.

2.1 g. of 3-furfuryl-adenine monohydrate melting at 244–245° C. is obtained. Yield: 30%.

Analysis for $C_{10}H_9N_5O \cdot H_2O$: Percent N
Calculated ------------------------------- 30.03
Found ---------------------------------- 29.95

The U.V. spectrum analysis for the monohydrate gives the following data:

| Solvent | λ Max. | λ Min. | ε Max. | ε .280 ε .260 |
|---|---|---|---|---|
| HCl 0.1 N | 276 | 238 | 17,500 | ε 45 |
| NaOH 0.01 N | 274 | 247 | 12,500 | ε 42 |

I claim:
1. A method for preparing 3-substituted adenines having the formula:

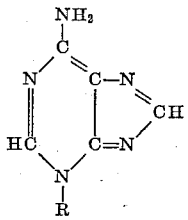

in which R is a substituent selected from the group consisting of alkyl of from 2 to 9 carbon atoms, lower alkenyl, lower alkinyl, lower dialkylaminoalkyl, cyclopentyl, furfuryl, benzhydryl, chlorobenzhydryl, —$(CH_2)_n$-phenyl, —$(CH_2)_n$-morpholino, —$(CH_2)_n$-piperazino, —$(CH_2)_n$-lower alkylpiperazino and —$(CH_2)_n$-phenylpiperazino and $n$ is a positive integer of from 1 to 4, comprising (1) heating together 4,6-diamino-5-formylamino-pyrimidine with R halide wherein R has the meaning previously defined, (2) treating the resulting quaternary salt of 3-R-5-formylamino-4,6-diaminopyrimidine with alkali, (3) treating the liberated free base with a cyclizing agent in alkaline medium at a temperature below 100° C., and (4) separating the 3-substituted adenine formed from the reaction medium.

2. A method for preparing 3-substituted adenines having the formula:

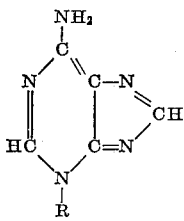

in which R is hydroxyalkyl, comprising (1) heating together 4,6-diamino-5-formylamino-pyrimidine with alkylene oxide, (2) treating the resulting quaternary salt of 3-R-5-formylamino-4,6-diaminopyrimidine, wherein R has the meaning as previously defined, with alkali, (3) treating the liberated free base with a cyclizing agent in alkaline medium at a temperature below 100° C., and (4) separating the 3-substituted adenine formed from the reaction medium.

3. A 3-substituted adenine having the formula:

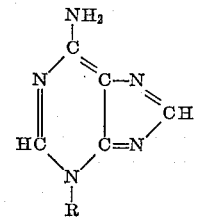

wherein R is a member selected from the group consisting of alkyl of from 2 to 9 carbon atoms, lower alkenyl, lower alkinyl, lower hydroxyalkyl, lower-dialkylaminoalkyl, cyclopentyl, furfuryl, benzhydryl, chlorobenzhydryl, —$(CH_2)_n$-phenyl, —$(CH_2)_n$-morpholino, —$(CH_2)_n$-piperazino, —$(CH_2)_n$-lower alkylpiperazino and —$(CH_2)_n$-phenylpiperazino, and $n$ is a positive integer of from 1 to 4.

4. A therapeutically acceptable acid addition salt of a 3-substituted adenine as claimed in claim 3.
5. 3-ethyl-adenine.
6. 3-n-nonyl-adenine.
7. 3-propargyl-adenine.
8. 3-(2-hydroxyethyl)-adenine.
9. 3-(2,3-dihydroxypropyl)-adenine.
10. 3-(2-dimethylaminoethyl)-adenine.
11. 3-(2-diethylaminoethyl)-adenine.
12. 3-benzyl-adenine.
13. 3-furfuryl-adenine.

References Cited by the Examiner

Baker et al.: Jour. Org. Chem., vol. 19, pages 632–7 (1954).

Denayer et al.: Comptes Rendus, tome 253, pages 2994–2996 (December 1961).

Leonard et al.: Jour. Am. Chem. Soc., vol. 82, pages 620–3 (1960).

Montgomery et al.: Jour. Am. Chem. Soc., vol. 83, pages 630–635 (February 1961).

NICHOLAS S. RIZZO, *Primary Examiner.*